US006223524B1

(12) United States Patent
Durcan

(10) Patent No.: US 6,223,524 B1
(45) Date of Patent: May 1, 2001

(54) SHROUDS FOR GAS TURBINE ENGINES AND METHODS FOR MAKING THE SAME

(75) Inventor: James Francis Durcan, Lebanon, OH (US)

(73) Assignee: Diversitech, Inc., Cincinnati, OH (US)

( * ) Notice: Subject to any disclaimer, the term of this patent is extended or adjusted under 35 U.S.C. 154(b) by 0 days.

(21) Appl. No.: 09/012,869

(22) Filed: Jan. 23, 1998

(51) Int. Cl.$^7$ ........................................ F02K 3/02
(52) U.S. Cl. ................. 60/226.1; 415/173.6; 416/2; 416/190
(58) Field of Search ................... 416/189, 190, 416/191, 2; 415/9, 173.1, 173.4, 173.6; 60/226.1

(56) References Cited

U.S. PATENT DOCUMENTS

| | | |
|---|---|---|
| 2,438,867 | 3/1948 | Rockwell et al. . |
| 3,034,762 * | 5/1962 | Fanti et al. ............................. 253/77 |
| 3,095,138 | 6/1963 | Warnken . |
| 3,601,500 | 8/1971 | Palfreyman et al. . |
| 3,857,650 | 12/1974 | Cerrato . |
| 3,918,840 | 11/1975 | Haworth et al. . |
| 4,022,540 * | 5/1977 | Young ..................................... 415/9 |
| 4,256,348 | 3/1981 | Lester et al. . |
| 4,270,256 | 6/1981 | Ewing . |
| 4,363,602 | 12/1982 | Martin . |
| 4,580,943 * | 4/1986 | Scully .................................. 415/116 |
| 4,702,673 | 10/1987 | Hansen et al. . |
| 4,926,710 | 5/1990 | Novotny . |
| 4,969,326 | 11/1990 | Blessing et al. . |
| 5,037,273 * | 8/1991 | Krueger et al. ....................... 416/190 |
| 5,141,400 * | 8/1992 | Murphy et al. .................. 416/204 A |
| 5,562,419 * | 10/1996 | Crall et al. ............................ 416/190 |
| 5,785,498 * | 7/1998 | Quinn et al. .......................... 416/224 |

FOREIGN PATENT DOCUMENTS

| | | |
|---|---|---|
| 2304043 | 1/1973 | (DE) . |
| 0835177 | 5/1960 | (GB) . |
| 2065237 | 6/1981 | (GB) . |

OTHER PUBLICATIONS

International Search Report for PCT/US99/01401 dated May 18, 1999.

* cited by examiner

Primary Examiner—Charles G. Freay
Assistant Examiner—Ehud Gartenberg
(74) Attorney, Agent, or Firm—Dinsmore & Shohl LLP

(57) ABSTRACT

A rotatable assembly for use with a gas turbine engine comprises a rotatable disk, and a plurality of blades for affecting a flow of air passing thereover during use. The blades are attached to the rotatable disk, and each one of the plurality of blades has a blade root and a blade tip disposed opposite said blade root. A first ring self supporting is disposed adjacent a first portion of each of the blade tips, the first ring being in interfering contact with the first portion of each blade tip when the rotatable disk is stationary. The interfering contact is preferably between about 0.01 inches and about 0.1 inches. The first ring can be provided over a portion of the blade tips or can extend from about the leading edge of each blade to about its trailing edge. A second ring in interfering contact with the blade tips can also be provided.

18 Claims, 7 Drawing Sheets

SHROUDS FOR GAS TURBINE ENGINES AND METHODS FOR MAKING THE SAME

TECHNICAL FIELD OF THE INVENTION

This invention relates to the field of rotating assemblies for use in gas turbine engines, and, more particularly, to rotating assemblies having a self-supporting shroud.

BACKGROUND OF THE INVENTION

The rotating assemblies of gas turbine engines (e.g., fans, boosters, compressors, and turbines) are typically used to impart or extract energy from a gas flow passing therethrough. These rotatable assemblies typically comprise a rotatable disk or rotor having a plurality of air foil projections or blades disposed thereabout.

While many designs have been proposed in the art, there continues to be a desire to reduce the weight, increase the durability, and improve the mechanical and aerodynamic performances of these rotatable assemblies.

While achieving the above-described benefits is often desirable, the rotatable assemblies and, in particular, the blades attached thereto should also be designed to accommodate vibratory stresses/deflections and aerodynamic loading effects. Often, accommodation of these design requirements is counter to the desire to reduce weight, increase durability, and improve mechanical/aerodynamic performance of the blades. For example, while more aggressive fan airfoil designs having long blade tip chords and forward blade sweep have long been recognized as desirable, such designs typically have undesirably high stresses at the root of the blade and low blade flex and torsion natural frequencies which can be excited by engine operation.

One solution proposed in the art for increasing blade damping (which reduces blade vibrations) has included the use of "part span" blade shrouds. These blade shrouds comprise short discrete elements which are fixedly attached to the tip or at the mid span of each blade. The blade shrouds can rub and/or interlock during engine operation so as to limit blade deflection, blade untwist, and blade camber changes which can occur as a result of the aerodynamic forces acting upon the blades during engine operation. While these blade shrouds can limit deflections and provide some damping, they also produce aerodynamic losses, increase blade weight and blade stress due to the centrifugal forces imparted upon the blades from the added weight and require more robust rotatable disks which can withstand these increased centrifugal forces.

Another solution is proposed in U.S. Pat. No. 5,037,273 to Kueger et al. which teaches a compressor impeller comprising a ring shaped band mounted at the blade tips. Each blade tip is slidably enclosed by a guide block, and the guide blocks are in turn fastened to the ring-shaped band. Filler pieces are provided between the guide blocks. While this design may have been adequate for its intended purpose, it requires numerous structural elements which slidably engage each other, thereby introducing potential wear problems, air leakage and aerodynamic drag problems, and also can add additional weight and attendant undesirable stresses to the band.

As such, there is a continuing desire in the art to provide rotatable assemblies for gas turbine engines which can limit deflections and reduce air leakage and drag, improve blade damping and which are simple, lightweight, and easy to manufacture. Still further, there is a continuing desire to provide rotatable assemblies which can accommodate blades which are lighter and incorporate more aggressive and efficient aerodynamic designs while reducing blade stresses and increasing the blade flex and/or torsional natural frequencies.

SUMMARY OF THE INVENTION

Accordingly, it is an object of the present invention to obviate the shortcomings of rotatable assemblies.

It is another object of the present invention to provide rotatable assemblies which increase blade frequency.

It is a further object of the present invention to provide rotatable assemblies which are lightweight and easy to manufacture.

It is still another object of the present invention to provide rotatable assemblies which can accommodate thinner blades having improved aerodynamic features.

It is a further object of the present invention to provide rotatable assemblies which can accommodate varying radial growth at a blade tip.

It is another object of the present invention to provide rotatable assemblies which can reduce or eliminate leakage between a shrouded blade and a casing.

It is yet another object of the present invention to provide rotatable assemblies which can accommodate foreign object impacts while minimizing damage to adjacent structures.

It is still yet another object of the present invention to provide simplified methods for manufacturing shrouded rotatable assemblies.

In accordance with one aspect of the present invention, a rotatable assembly for use with a gas turbine engine is provided which comprises a rotatable disk, a plurality of blades for affecting a flow of air passing thereover during use which are attached to the rotatable disk. Each one of the plurality of blades has a blade root and a blade tip disposed opposite the blade root. A first ring is disposed adjacent a first portion of each of the blade tips, the first ring being in interfering contact with the first portion of each blade tip when the rotatable disk is stationary. The interfering contact is preferably between about 0.01 inches and about 0.1 inches.

The first ring can be provided over a portion of the blade tips or can extend from about the leading edge of each blade to about its trailing edge. A second ring in interfering contact with the blade tips can also be provided. The rings can be made from a composite material and preferably have a thickness of between about 0.06 inches and about 1 inch. A multi-piece blade comprising a first piece formed from a first material and a second piece formed from a second material, wherein the second material has a density which is less than the density of the first material can be provided in combination with one or more of the rings.

BRIEF DESCRIPTION OF THE DRAWINGS

While the specification concludes with claims particularly pointing out and distinctly claiming the invention, it is believed the same will better understood from the following description taken in conjunction with the accompanying drawings in which:

DETAILED DESCRIPTION OF THE PREFERRED EMBODIMENTS

Reference will now be made in detail to the preferred embodiments of the present invention, examples of which are illustrated in the accompanying drawings wherein like numerals indicate the same elements throughout the views. As will be understood hereafter, the present invention relates to rotatable assemblies for gas turbine engines comprising a rotatable disk having a plurality of air foil projections or blades disposed thereabout and at least one continuous annular shroud or ring disposed adjacent the tips of the blades for increasing flex and/or torsion blade frequencies and the damping of the same. Thus, the rotatable assemblies of the present invention preferably increase the blade frequencies so as to provide adequate margin between the blade frequency and the engine excitation frequencies (e.g., caused by rotor rotation, strut distortions, etc.) encountered during use. More preferably, at least the first torsional and first flexure natural frequencies of the blades are increased by the present invention above at least the 2 per revolution harmonic line (i.e., the rotational speed of the engine multiplied by the number of blades and multiplied by a factor of 2) when plotted on a Campbell diagram, as is known in the art. The rotatable assemblies of the present invention can be provided in the form of a fan, booster, compressor, low pressure turbine, or the like.

Figure 1:
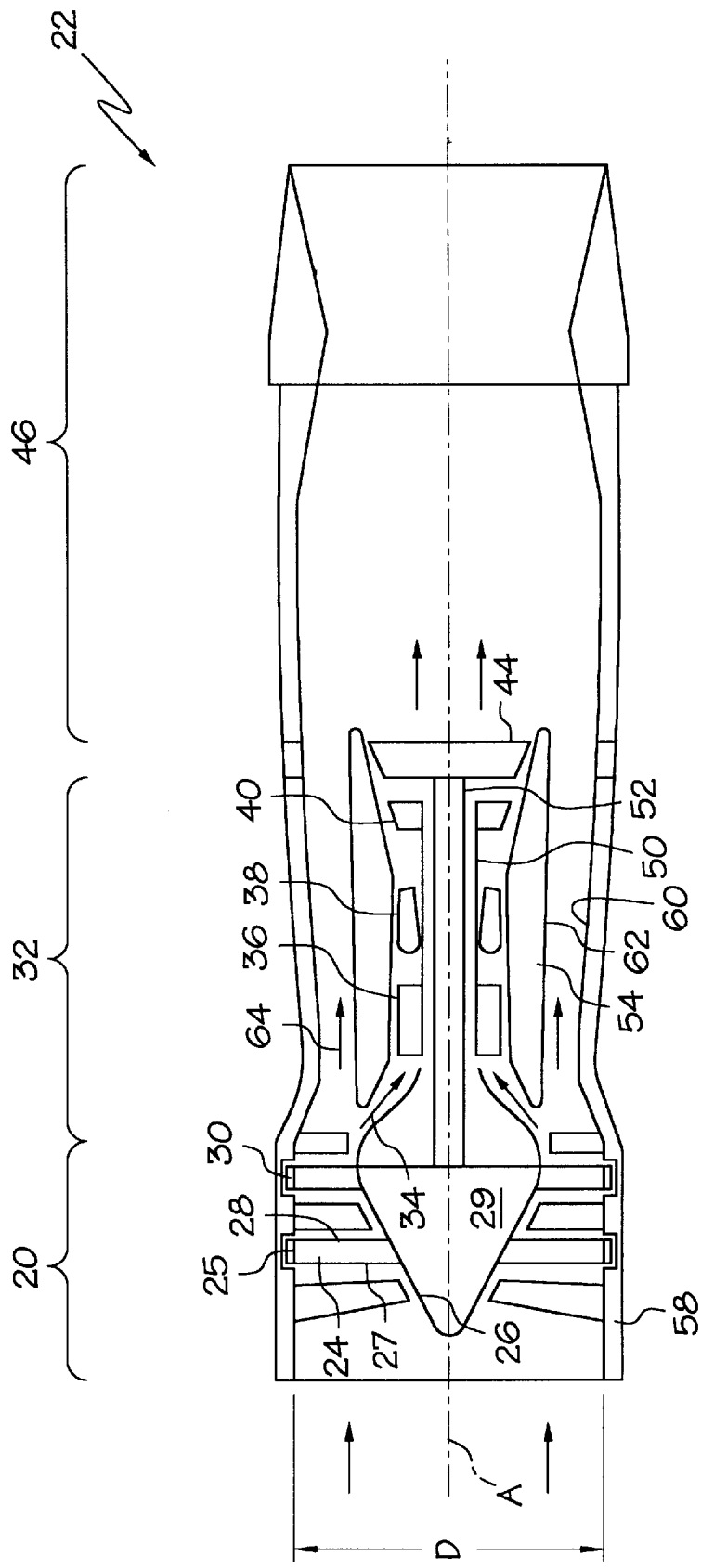
FIG. 1 is a schematic cross-sectional side view of an exemplary gas turbine engine made in accordance with the present invention.

While it is contemplated that the present invention can be adapted for use in land, marine, or aircraft type gas turbine engines, the present invention will be described by way of example herein with respect to a fan assembly 20 of an aircraft gas turbine engine 22, as shown in FIG. 1. The fan assembly 20 comprises a plurality of a radially outwardly extending fan blades 24, each of which have a blade tip 25 and a blade root 26 disposed opposite the blade tip 25. The blade tip 25 can be provided at a constant radius from the engine centerline A or at a variable radius such that the blade tip 25 has an increasing or decreasing slope between its leading edge 27 and trailing edge 28. Each one of the plurality of fan blades 24 is attached to a rotor or rotatable disk 29 which is disposed adjacent the blade root 26. The blade root 26 can be provided in the form of a cantilevered axial dovetail, a cantilevered circumferential dovetail or a pin joint to facilitate attachment of the fan blades 24 to the rotatable disk 29, as is known in the art. Alternatively, the fan blades 24 can be integrally formed with the rotatable disk 29 to form a blisk or bladed disk. The fan blades 24 can be manufactured from metal alloys, composite materials, or the like.

In accordance with one aspect of the present invention, a self-supporting shroud or annular ring 30 is disposed adjacent the blade tips 25 and is preferably in interfering contact with the same during use. The interfering contact between the ring 30 and the blade tip 25 can both reduce the total stress experienced by the fan blade 24 during use and can increase the natural frequencies (e.g., the first flexural and first torsional) of the fan blade 24. The total stress is reduced due to the residual compressive stresses induced in the fan blade 24 by the interfering contact while the natural frequencies are increased because the blade tip 25 is mechanically coupled and/or constrained by the ring 30. More particularly, the blade 24 is constrained because of friction between the ring 30 and the blade tips 25 and because ring 30 tends to deform or "flatten" between blade tips 25, as shown in an exaggerated manner for clarity in FIGS. 2 and 3, such that the fan blade 24 will behave as a fixed-fixed member (i.e., the blade root being fixed by the rotatable disk 29 and the blade tip 25 being fixed by the ring 30) rather than a fixed-free member when a ring 30 is not provided (i.e., the blade tip 25 is not constrained). In other words, the interfering contact at each blade tip 25 (which is preferably the same among blade tips) produces a uniform inward radial load and ring blade deflection at each blade tip while slightly less ring deflection is produced between blade tips so that a "pocket" 31 is formed around the blade tips by the ring. This pocket prevents axial and tangential movement of the blades, thereby providing positive restraining of the blade in the engine axial, radial, tangential (or hoop) directions. In addition, constraint of the blade tip 25 by the ring 30 can result in the fan blade 24 responding to force excitations in a system mode where all the fan blades 24 respond together in phase rather than the blades individually responding, as would be the case if the blade tips were not constrained. The increase in blade natural frequencies can provide rotatable assemblies of the present invention which are less susceptible to excitation from inlet air flow distortions, wakes from upstream vanes or struts, cross winds and the like. In addition, the above-described benefits can permit more aggressive aerodynamic blade designs (e.g., increased forward sweep, etc.), and the blade root 26 can be thinned since it no longer must resist the cantilevered flexure of the blade, thereby resulting in thinner and more lightweight blades.

Referring again to FIG. 1, the gas turbine engine 22 further comprises a core engine 32 which is disposed downstream of the fan assembly 20, wherein the core engine 32 has an inner flow path 34 comprising a compressor 36, a combustor 38, and a first or high-pressure turbine assembly 40. The gas turbine engine 22 also preferably includes a second or a low pressure turbine assembly 44 and an exhaust assembly 46 downstream of the core engine 32. A first shaft 50 rotatably interconnects the compressor 36 and the high pressure turbine assembly 40. A second shaft 52 is disposed co-axially inside the first shaft 50 and rotatably interconnects the second or low pressure turbine assembly 44 and the rotatable disk 29. The core engine 32 and low pressure turbine assembly 34 are surrounded by a casing or a core nacelle 54 which supports the first and second shafts 50 and 52 by bearings (not shown). A fan nacelle 58 surrounds the fan assembly 20 and comprises a fan nacelle inner surface 60 which, in combination with the core nacelle outer surface 62, define an annular fan bypass duct 64.

Air entering the fan assembly 20 undergoes a pressure rise across the fan assembly 20 and is subsequently split between the fan bypass duct 64 and inner flow path 34 of the core engine 32. The pressurized air entering the inner flow path 34 undergoes a further pressure rise across the compressor 36 after which it is mixed with fuel in the combustor and ignited. The rapidly expanding heated gases exit the combustor 38 and enter the high pressure turbine assembly 40, wherein some of the energy of the combustion gases is extracted and used to rotate the first shaft 50 and the compressor 36 to which it is fixably connected. The combustion gases, upon exiting the high pressure turbine assembly 40 enter the low pressure turbine assembly 42 which converts some of the energy of the combustion gases into rotation of the second shaft 52 and the fan assembly 20 to which it is fixably connected.

Figure 2:
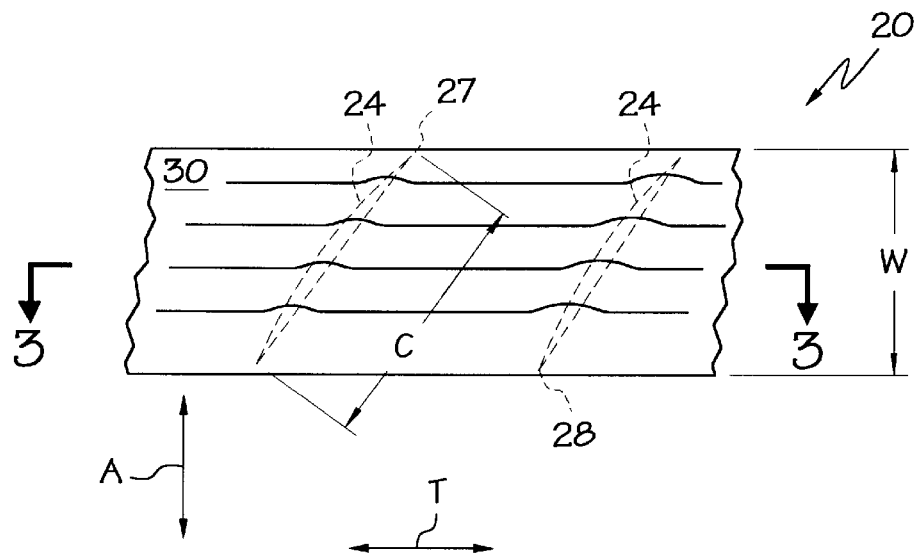
FIG. 2 is a partial schematic top view of a rotatable assembly made in accordance with the present invention wherein the ring is illustrated in an exaggerated flattened state.
Figure 3:
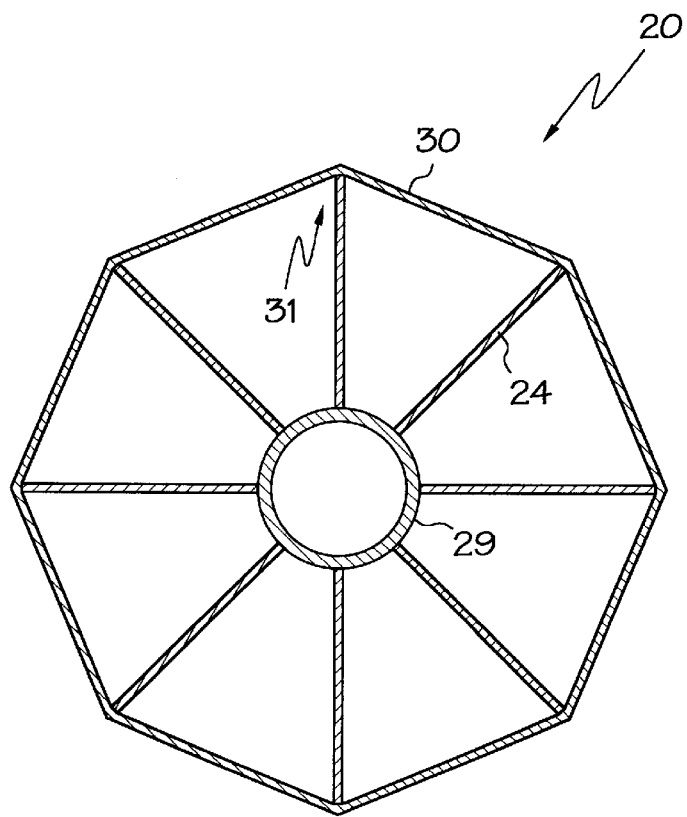
FIG. 3 is a partial schematic cross-sectional front view of the rotatable assembly of FIG. 2.
Figure 4:
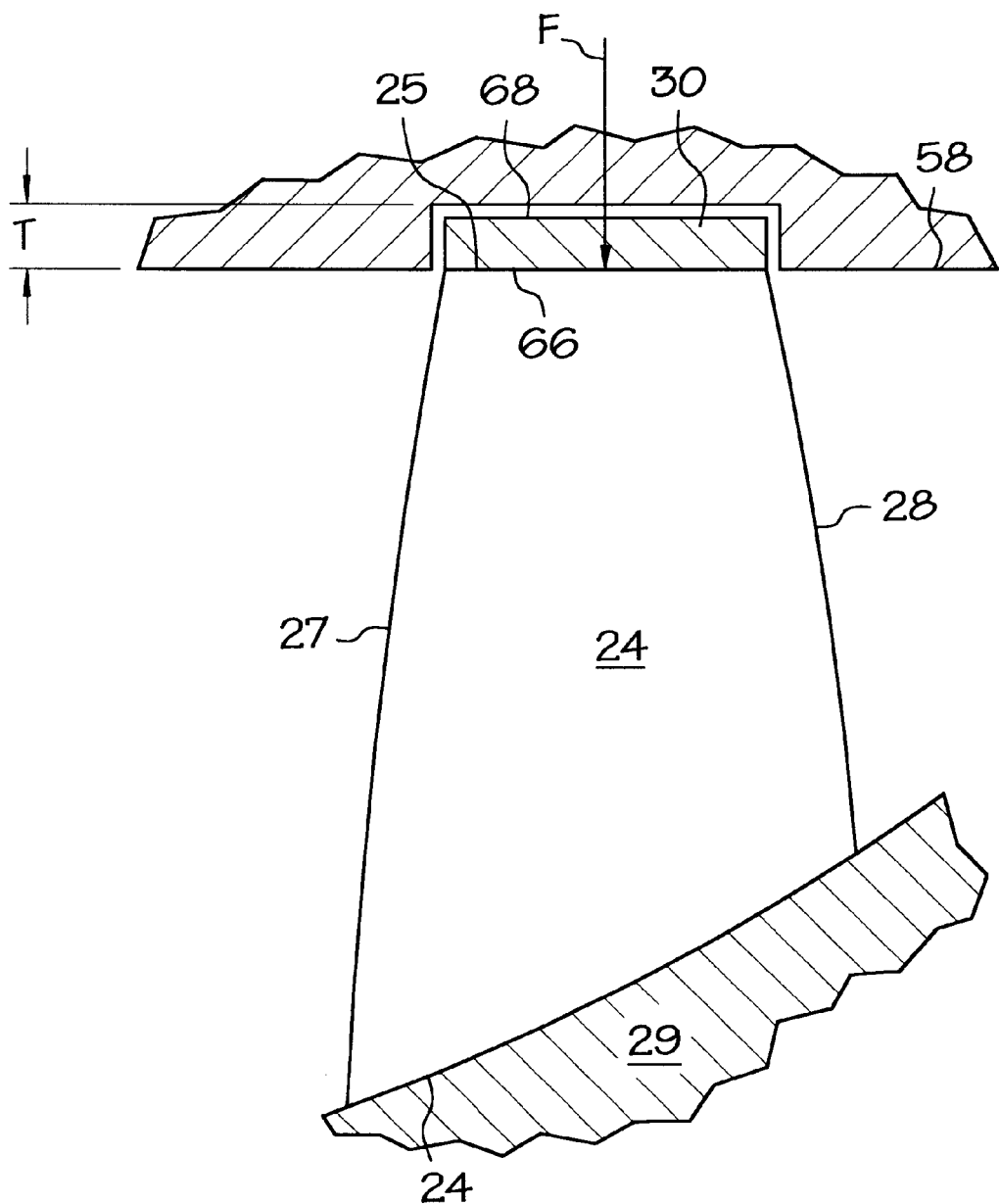
FIG. 4 is an enlarged partial schematic cross-sectional side view of the fan assembly of the gas turbine engine of FIG. 1.

Referring to FIGS. 2 and 4, an exemplary fan blade 24 and ring 30 of the fan assembly 20 will now be described in greater detail. The ring 30 is provided in the form of a continuous substantially hoop-shaped member having a ring inner surface 66 and a ring outer surface 68. The ring inner diametrical surface 66 is disposed adjacent to, and, more preferably, in interfering contact with the blade tip 25 of each one of the plurality of fan blades 24. In other words, the ring inner diametrical surface 66 is sized less than the diameter D (FIG. 1) from blade tip to opposing blade tip of the rotatable assembly so as to produce an interfering contact. The width W of the ring 30 (FIG. 2) preferably extends from about the leading edge 27 of each fan blade 24 to about its trailing edge 28, as best seen in FIG. 2. Thus, the width W of the ring 30 is preferably substantially co-extensive with the chord C of each fan blade 24, although the entire blade tip 25 need not be covered by the ring 30 (e.g., the ring 30 can be disposed adjacent a center portion of the blade tip, adjacent a portion of the blade tip near the leading edge or the trailing edge 28 of the blade 24, etc.). The ring 30 is also preferably substantially self-supporting. As used herein, the phrase "self supporting" is intended to refer to a structure which does not impart (or imparts insubstantial) centrifugal forces upon adjacent structures during use. For example, the mass of the ring 30 would not increase the centrifugal force upon the fan blade 24 during operation, because the interference fit produces a radial force F inward on the blade tip 25.

As discussed more fully hereafter, the radial growth or deflection Δ L of the blade tip 25 and the ring 30 from centrifugal forces and thermal growth during use are preferably substantially the same so that the ring inner surface 66 of the ring 30 maintains interfering contact with blade tip 25 throughout operation (e.g., during both steady state and transient operating conditions). Most preferably, the interfering contact is maintained during overspeed and other abnormal operating conditions. A ring 30 whose radial growth is greater than the radial growth of the fan blade 24 and the rotatable disk 29 requires a relatively high interfering contact to prevent the loss of the same during engine operation. Conversely, a ring 30 whose radial growth is less than the radial growth of the fan blade 24 and the rotatable disk 29 requires a smaller interfering contact, although the ring 30 will be subjected to increased bending stresses as the circumferential "flattening" of the ring increases between fan blades from the growth mismatch. As such, it is desirable to match as closely as possible the radial growth of both the ring 30 with the combined radial growth of the fan blade 24 and the rotatable disk 29. Maintaining the interfering contact provides a positive radial force F on each blade tip 25 and preferably mechanically couples each fan blade 24 in both the tangential direction T and engine centerline direction A due to the flattening of the ring. This can increase the overall first flexural and first torsional natural frequencies of the fan blade 24 while decreasing the stresses at the blade root as well as blade "hot spot" stresses (i.e., localized areas of high stress).

Preferably, the ring 30 is sized so that the amount of interfering contact between the ring 30 and the blade tip 25 is at a maximum at assembly and near an acceptable minimum during operation. A ring 30 having minimum interfering contact during operation will also have a total stress which is at a minimum, thereby providing a ring 30 which maximizes its low cycle fatigue life. The amount of interfering contact between the ring 30 and the blade tip 25 is preferably the difference between the total radial growth or deflection $\Delta L_{ring}$ of the ring 30 and the total radial growth or deflection $\Delta L_{blade}$ of the fan blade 24 during engine operation. The total radial growth of the ring can be approximated by equation (1) below:

$$\Delta L_{total} = \Delta L_{mechanical} + \Delta L_{thermal} \tag{1}$$

where:

$\Delta L_{mechanical}$ is the total radial growth of the ring from rotation $\Delta L_{thermal}$ is the total radial growth of the ring from thermal expansion The total radial growth from rotation $\Delta L_{mechanical}$ and the total radial growth from thermal expansion $\Delta L_{thermal}$ can be further approximated as:

$$\Delta L_{thermal} = R\alpha\Delta T$$

$$\Delta L_{mechanical} = \rho U_t^2/g * R/E$$

where:

$U_t$=rotational speed $\rho$=density $\alpha$=coefficient of thermal expansion

R=radius

E=elastic modulus

Thus, the total ring radial growth $\Delta L_{total}$ is a function of the material properties (e.g., density and modulus of elasticity), the coefficient of thermal expansion, and the geometric and operational aspects (e.g., radius and tip speed).

The blade tip growth is a function of blade and disk material properties (e.g., density, modulus of elasticity, coefficient of thermal expansion) and the geometric and operational aspects of the blade and disk. Usually the blade geometry and disk geometry are complex with non uniform stress and temperature distributions. A Finite Element Model (FEM) and Finite Element Analysis (FEA) are often used to determine the blade and disk stress distributions, temperature distributions, and blade tip radial deflection at various operating conditions.

Based upon the foregoing, the interfering contact is preferably less than about 0.02 inches in applications where the diameter D (FIG. 1) is about 17 inches and the design blade tip speed is about 1,500 ft/sec. While it is preferred that the interfering contact is less than about 0.02 inches, it is contemplated that other amounts of interfering contact can be provided to accommodate other operating conditions or ring configurations. For instance, the interfering contact can be between about 0.01 inches and about 0.1 inches for diameters D between about 15 inches and 100 inches, respectively.

During operation, the ring 30 is subjected to stresses induced by rotational forces (e.g., centrifugal or hoop forces), bending forces caused by any circumferential bending from the interfering contact (e.g., "flattening" of the ring 30), hoop forces induced by the interfering contact, and the ring forces required to constrain the blade tip 25 from changing its twist angle and camber during engine operation. The total stress experienced by the ring 30 during use will be the integration of these individual stresses. The bending stresses can be minimized by reducing the thickness T of the ring 30 which is, preferably, between about 0.06 inches and 1 inch for rotor diameters D between about 10 inches and 100 inches, respectively, and, more preferably, about 0.1 inches for a diameter D of about 17 inches. While these thickness ranges are preferred, it is contemplated that other ring thicknesses can be provided as a function of the size of the diameter D.

Figure 5:
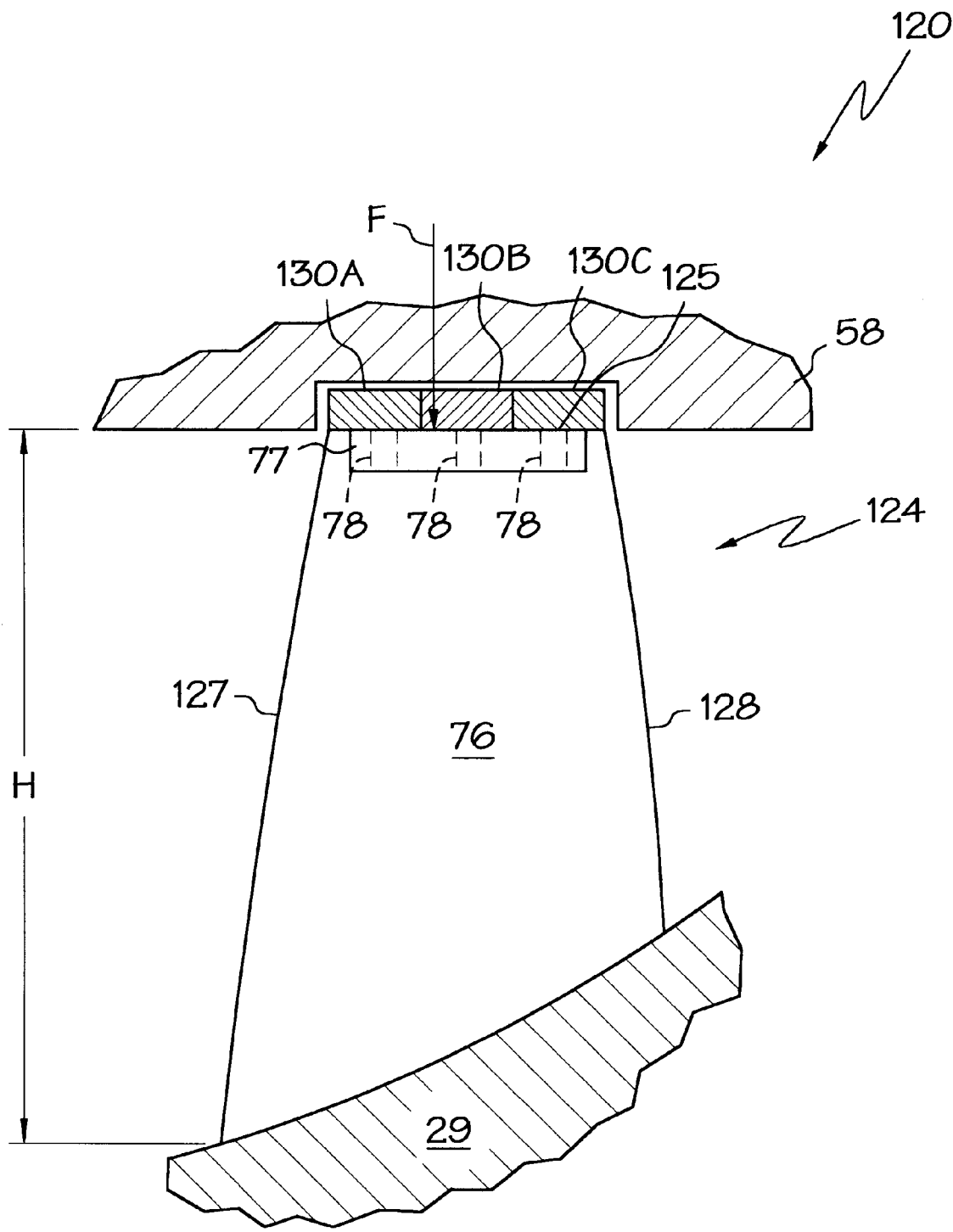
FIG. 5 is a partial schematic cross-sectional side view of a rotatable assembly made in accordance with the present invention, wherein the rotatable assembly comprises multiple tip rings and the blade has a frangible portion.

Another embodiment of the present invention is provided in the form of a frangible multi-piece blade rotatable assembly 120, illustrated in FIG. 5, which is lighter in weight and is particularly suited for accommodating a foreign object impact during operation. The rotatable assembly 120 comprises a multi-piece blade 124 having a first piece 76, a frangible second piece 77 and one or more pins 78 which are preferably integrally formed with the blade 124. More preferably, the pins 78 are made of the same material (e.g., a metal alloy) as the first piece 76 of the blade 124, and, most preferably, the leading and trailing edge portions of the blade 124 are also formed from the same material as the first piece 76 of the blade 124 in order to protect the second piece 77 from erosion or other abrasive damage from sand, ice and the like. The second piece 77 extends from about the leading edge 127 to about the trailing edge 128 and is formed from a lightweight low-density material (e.g., composite, plastic, etc.) which can preferably detach upon deflection of the blade 124 during a foreign object impact. Thus, the multi-piece blade 124 provides a lighter weight blade over conventional blades because the second piece is made from a lightweight low-density material, thereby increasing blade natural frequencies and improving engine performance due to both the decrease in blade weight and equivalent blade height.

Further, the detachability of the second piece 77 can allow the blade 124 to deflect following an impact without substantially damaging the rings. The pins 78 will preferably re-engage one or more of the rings following the blade deflection so that the rings can continue to at least partially constrain the blade 124 so that the rotatable assembly can continue operation. In addition, the effective length of the blade 124 will be reduced after the second piece 77 has detached from the blade 124, and, as such, the flex and torsional natural frequencies of the blade 124 will tend to increase because the vibrating length of the blade is reduced. This can tend to maintain the vibratory stability of the blade 124 in the event of a loss of the interfering fit between one or more of the rings 130 and the blade 124. Because three partial chord rings (i.e., rings which span only a portion of the blade chord) 130A, 130B, and 130C are provided, however, the probability increases that at least one of the partial chords will remain intact (e.g., is not fractured) following a blade deflection from a foreign object impact. This, in combination with the increased blade frequency from the detachment of the second piece 77, can provide a rotatable assembly which can continue operating following the foreign object impact.

The pins 78, second piece 77, and leading and trailing edge portions of the first piece 76 which contact the rings 130 will each carry a portion of the radial force F produced by the interfering contact between the rings 130 and the same. As such, the second piece 77 is restrained by the rings 130. Preferably, the second piece 77 comprises up to about 15% of the radial height H of the blade 124 for a radial force F of between about 1000 lbs. and about 5000 lbs. More preferably, the second piece 77 comprises between about 10% and about 15% of the height H of the blade 124, although it is contemplated that greater than 15% can be achieved as the radial force F increases (i.e, a greater interfering contact is provided).

The multi-ring rotatable assembly 120 is also particularly adapted to accommodate varying degrees of blade tip radial growth. For example, under certain operating conditions a portion of the blade tip adjacent the leading edge of a blade can radially grow or deflect more than a portion of the blade tip adjacent the trailing edge of the blade, with the mid-chord portion growing the least. While this non-uniform radial growth of the blade can be accommodated by the previously described rings of the present invention by increasing the interfering contact ΔR so that it is maintained with the mid-chord section of the blade tip during engine operation, this can also increase the bending stresses induced in the ring because of the increased interfering contact at the leading and trailing edges.

The multi-ring rotatable assembly 120 illustrated in FIG. 5, however, can better accommodate radial growth difference between the leading edge 127 and the trailing edge 128 of the blade tip 125 (especially where it is desirable to provide a fully shrouded blade tip) because the amount of interfering contact ΔR between the ring and the blade tip can be selectively adjusted between the rings. For example, the ring 130A positioned adjacent the leading edge 127 can be provided with a lower initial interfering contact than the ring 130B disposed adjacent the trailing edge 128 if the portion of the blade tip 125 adjacent the ring 130A undergoes a larger radial growth than the portion of the blade tip 125 disposed adjacent the ring 130B. Preferably, the rings 130 are positioned adjacent the blade tip 125 such that neither ring simultaneously spans a portion of the blade tip 125 which undergoes both a large radial growth and a small radial growth. In other words, the rings should be positioned adjacent blade tip portions having relatively uniform radial growth there across during engine operation. As the amount of radial growth variation increases across the blade tip 125, the width W of the rings 130 can be decreased in order to better accommodate this increased variation and ensure that the rings do not simultaneously span tip portions having substantially differing amounts of radial tip growth. In addition to providing rings of differing widths W, the rings 130 can be provided with different thicknesses T and even formed from different materials in order to best accommodate the localized blade tip radial growth adjacent each partial chord ring. As will be understood, the above-described benefits of a multi-ring rotatable assembly can be provided separately or in combination with a blade having a frangible portion.

Further, the arrangement of the partial chord rings with respect to the blade tip can be varied to also accommodate the amount of blade constraint and the level of reliability required. For example, increasing the number of rings can increase the reliability of a rotatable assembly because it will be less likely that all of the multiple partial chord rings will fracture if the blade 120 is impacted by a foreign object during operation. A multiple ring configuration also permits the rings 130 to translate or circumferentially move relative to each other so that the blade 120, while still mechanically coupled and constrained by the "flattening" of the rings, can untwist and change camber during engine operation. This can reduce or eliminate the ring stresses which are induced in the full chord ring 30 by the shear and transverse forces constraining the blade from changing camber and twist while still maintaining the interfering contact which tends to flatten the ring and increase a blade's natural frequency because the blade tip is no longer free. If the width W of the partial chord rings is small, the blade tip 125 is constrained similar to a pinned mechanical joint (as opposed to a fixed joint for the full chord ring and a free joint for an unconstrained blade tip).

Figure 6:
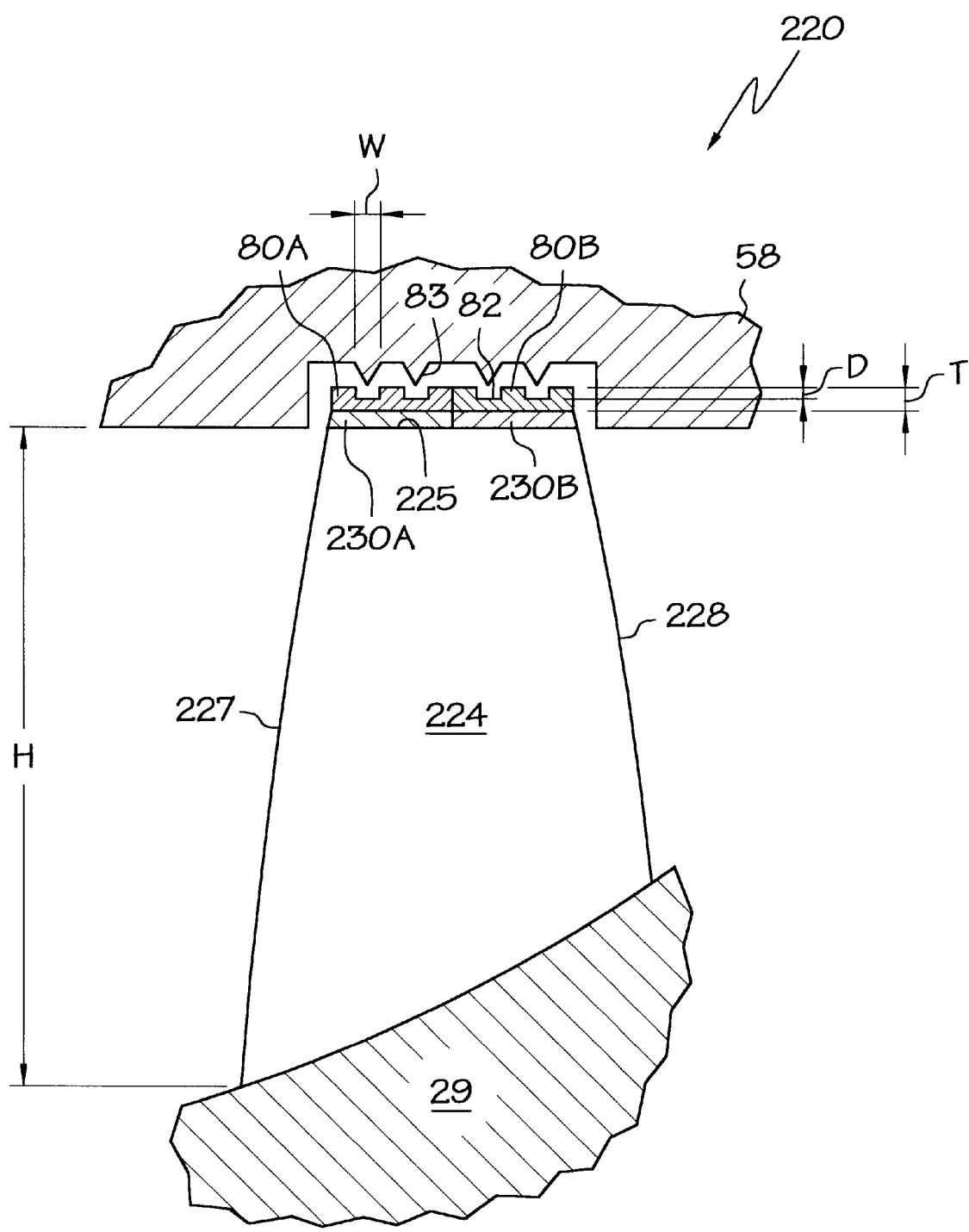
FIG. 6 is a partial schematic cross-sectional side view of a rotatable assembly made in accordance with the present invention having a slotted seal member which cooperates with a toothed seal member.

Yet another preferred embodiment of the present invention is illustrated in FIG. 6 as rotatable assembly 220 which comprises a first ring 230A and a second ring 230B disposed about blade tip 225 of a blade 224 (i.e., a fully shrouded blade tip). A first wear strip or ring seal 80A and second ring seal 80B are disposed adjacent to the first ring 230A and the second ring 230B, respectively. The first and second ring seals 80A and 80B are preferably formed from a honeycombed material which is adhesively bonded to their respective adjacent ring. Alternatively, the first and second seals 80A and 80B can be integrally formed with the first and second rings 230A and 230B (i.e., formed from substantially the same material or single piece of material). Thus, the fist and second ring seals 80A and 80B rotate with the first and second rings 230A and 230B during use.

One or more slots 82 are disposed in the ring seals 80A and 80B opposite one or more sealing teeth 83. The sealing teeth 83 cooperate with the first and second ring seals 80A and 80B to prevent the leakage of air over the shrouded blade and reduce the drag between the rings and the fan nacelle 58 during use. Preferably, the thickness T of ring seals 80A and 80B is between about 30% and 50% of the thickness of the rings and the tips 84 of the teeth 83 are disposed substantially coplanar with the top surface 85 of the ring seals 80A and 80B. Most preferably, the width W of the slots 82 are at least about 0.1 inches and the depth D is between about 0.01 and about 0.02 inches so that sufficient clearance is provided to avoid contact between the teeth 83 and the ring seals 80A and 80B during use (e.g., from rotor thermal growth, maneuver loads, etc.). While the above-described configuration is preferred, it is contemplated that other arrangements would be suitable. For example, a single ring and seal can be provided across substantially all of the blade tip 225. In addition, the size of the seal teeth 83 and the ring seal 80 can be varied as the blade height H varies.

Figure 7:
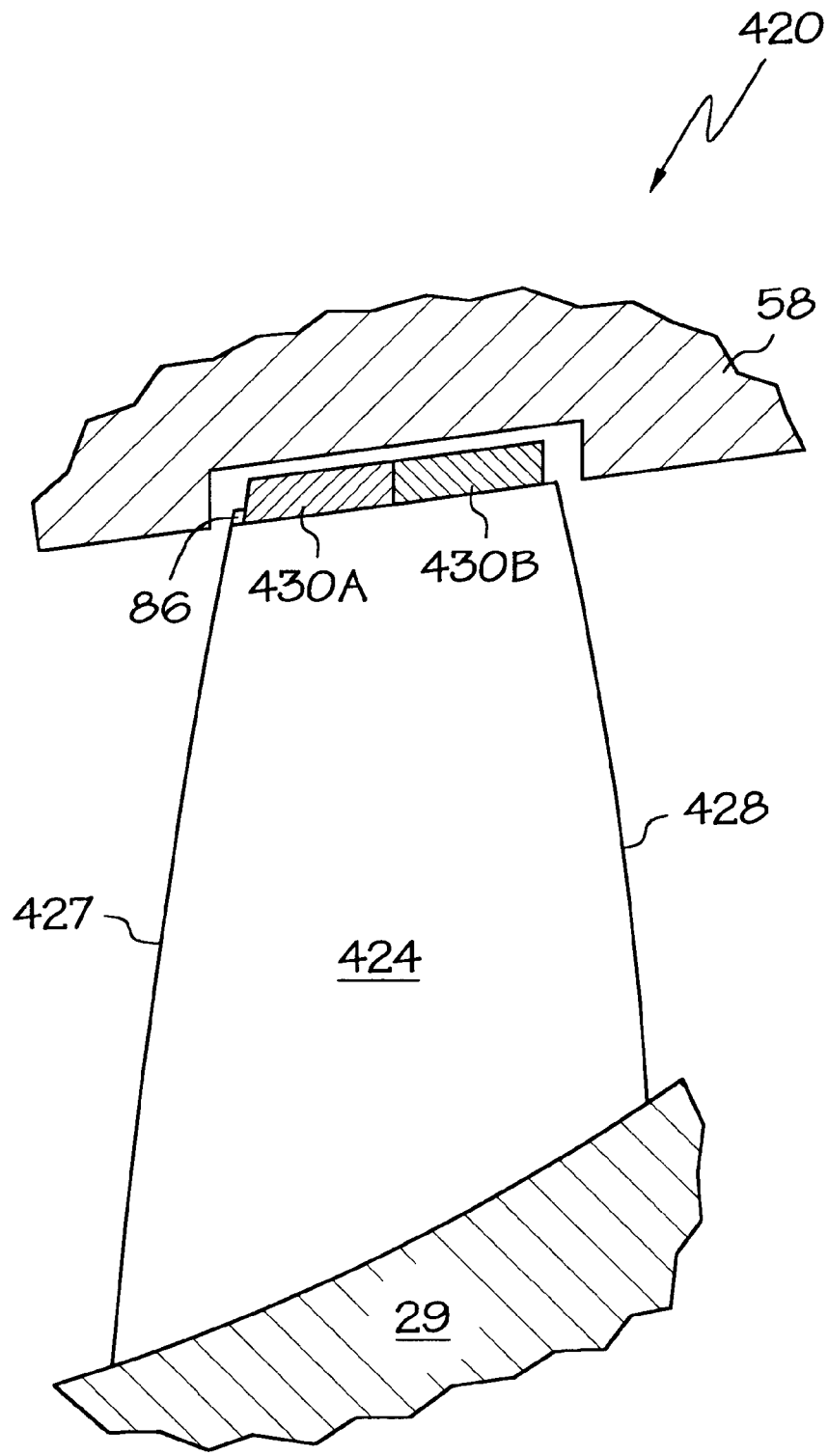
FIG. 7 is a partial schematic cross-sectional side view of a rotatable assembly made in accordance with the present invention, wherein the blade comprises a shear pin.

Still yet another multi-ring rotatable assembly 420 is illustrated in FIG. 7, wherein the blade 424 comprises a shear pin 86 disposed at the leading edge 427 of the blade 424. The blade tip 425 is preferably provided with a slope between the leading edge 427 and the trailing edge 428. The combination of the sloping blade tip 425 and the shear pin 86 can additionally prevent separation of the rings 430A and 430B from the rotatable assembly 420 during operation. In other words, the radially increasing slope from the leading edge 427 to the trailing edge 428 of the blade tip 425 tends to prevent the rings 430 from moving along the engine centerline direction A toward the trailing edge 428 if the interfering contact ΔR is lost during operation. Similarly, the shear pin 86 tends to prevent the rings 430 from moving along the engine centerline direction A toward the leading edge 427 if the interfering contact ΔR is lost. In the event of a foreign object impact, the shear pin 86 preferably fractures so that the blade 424 is free to deflect without damaging the rings 430. It is also contemplated that a shear pin can be provided at the trailing edge 428 in combination with a shear pin at the leading edge 427 or merely at the trailing edge 428 in an arrangement where the blade tip is provided with a slope decreasing between the leading edge 427 and the trailing edge 428 (i.e., opposite that shown in FIG. 7).

Figure 8:
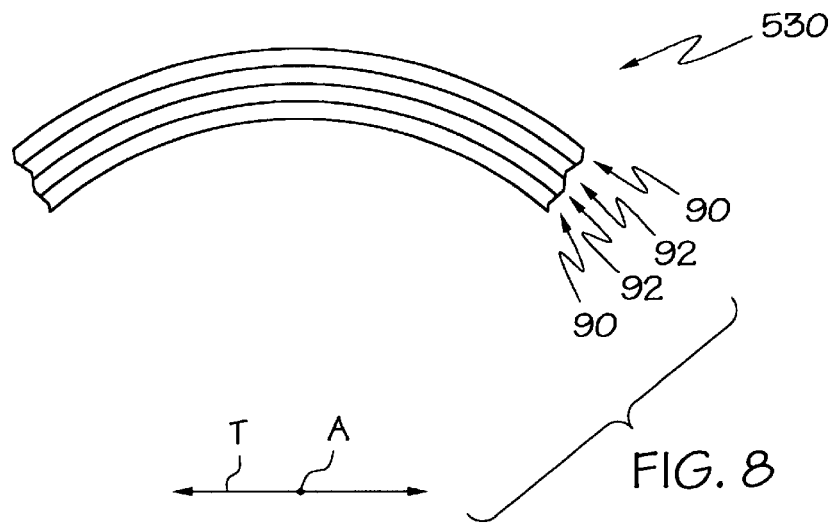
FIG. 8 is a partial schematic side view of an exemplary ring of the present invention comprising an OMC composite material, wherein a plurality of material layers are shown in an exaggerated manner for clarity.

In accordance with another aspect of the present invention, the rings are preferably formed from a composite material which is lightweight, has a high strength and stiffness and a low coefficient of thermal expansion. These material properties can provide a ring which is self-supporting at very high rotational speeds while minimizing its radial thermal growth. More preferably, the ring is formed from a metal matrix composite material (MMC) or an organic matrix composite material (OMC). FIG. 8 illustrates an exemplary composite ring 530 containing a matrix component 86 (best seen in FIG. 9) and a fiber component 88 (best seen in FIG. 9) which are preferably combined in a pre-impregnated tape or fabric like form and subsequently bonded under heat and pressure to achieve the properties of high strength and stiffness with low density. The OMC materials are suitable for forming rings which are exposed to operational temperatures of less than about 350° F. and rotational speeds of less than about 2000 ft/sec while the MMC materials are suitable for forming rings which are exposed to operational temperatures of less than about 1000° F. and rotational speeds of less than about 1500 ft/sec.

The matrix component of an OMC material typically comprises a thermosetting resin, such as an epoxy, polyester, or polyimide, and usually cures or hardens in the presence of a catalyst, such as heat or pressure. Alternatively, the matrix component of an OMC material can be provided in the form of a thermoplastic resin, such as a polycarbonate or polysulfone. The matrix component of an MMC material can comprise metals such as aluminum, titanium, titanium aluminide, and the like. The fibers 88 of the OMC materials or the MMC materials are typically formed from boron, graphite, or carbide. Most preferably, the OMC material comprises graphite fibers and a bismaleimide (BMI) or a polyimide resin matrix component while the metal matrix composite material comprises silicon carbide fibers and a titanium alloy such as Ti 6242 or Ti 6-4.

Figure 9:
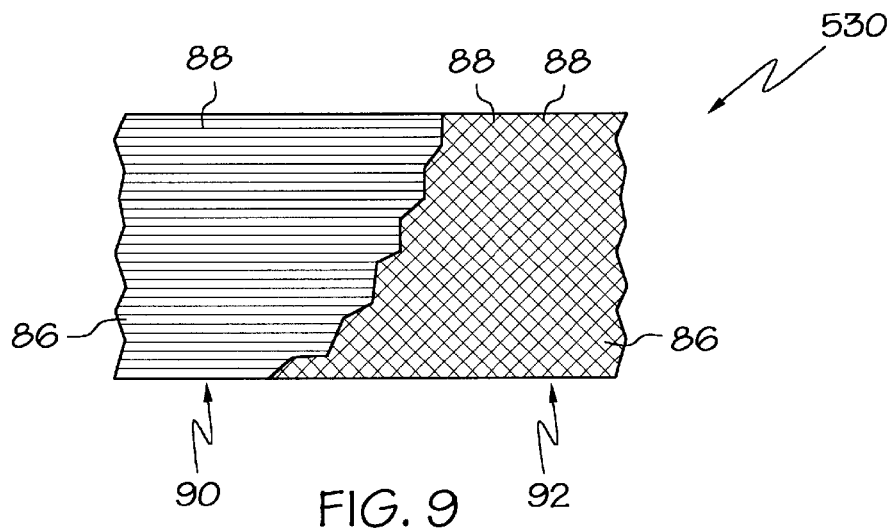
FIG. 9 is a partial schematic top view of the composite ring of FIG. 8, wherein a portion of the top unitape layer has been removed to illustrate the fabric layer below.
Figure 10:
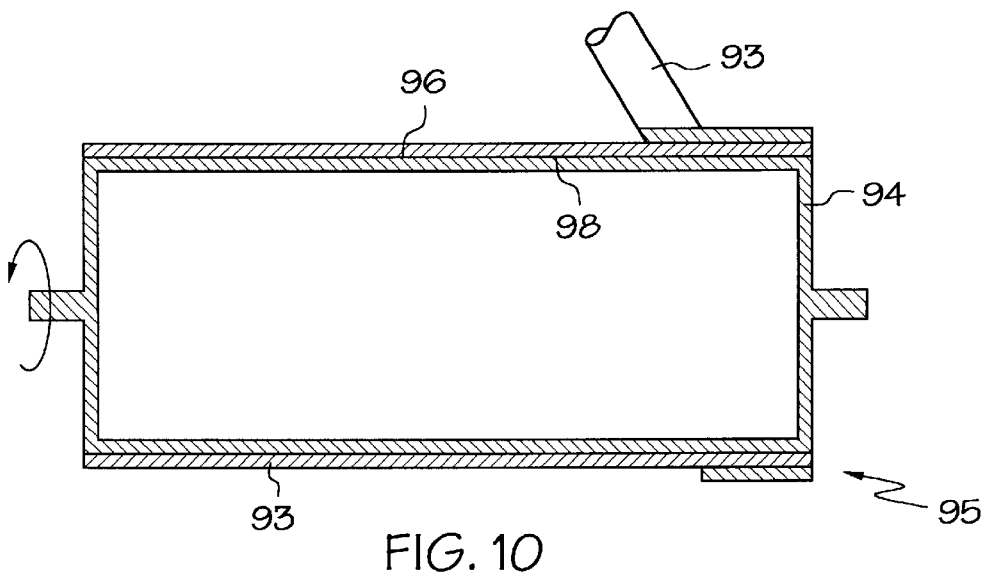
FIG. 10 is a schematic cross-sectional side view of a mandrel and composite tube used in forming rings of the present invention.

In MMC materials, unidirectional fiber arrangements (i.e., the fibers are disposed substantially parallel to each other in a unidirectional manner) provide high strength and stiffness in the fiber direction while the metal matrix component typically provides adequate levels of strength and stiffness in the direction transverse to the fibers, although fibers can also be provided in multiple directions in MMC materials if desired. OMC materials also provide high strength and stiffness in the fiber direction, but tend to have lower strength and stiffness properties in the direction transverse to the fiber. As such, it is often desirable to provide the fibers in multiple directions to improve the strength and stiffness of the OMC materials, such as shown in FIG. 9. For example, this can be achieved by a combination of unitape material 90 and fabric material 92. Unitape materials comprise a pre-impregnated matrix component and fibers which are unidirectional while fabric materials, or biased plies, comprise a pre-impregnated matrix component and fibers which are woven in about equal quantities in directions which are substantially perpendicular to each other.

If a ring is to constrain the blade tips in the engine transverse or hoop direction T (such as ring 30 would), an OMC material used to form the ring preferably comprises about 50% unitape material and about 50% fabric material. More preferably, the fabric material 92 is oriented so that its fibers 88 are about 45 degrees to the fibers 88 of the unitape material 90 which are oriented in the hoop direction T and, most preferably, a plurality of fabric material layers 92 are sandwiched between two unitape material layers 90, as best seen in FIG. 8. As will be understood, the number of plies (i.e., material layers) can be varied to adjust the ratio of unitape material to fabric material, as desired to accommodate varying amounts of induced stress during use. For example, a ring can be formed from a 60% unitape and 40% fabric combination, which has lower strength in the transverse direction than the previously described 50/50 combination, and is suited for use in situations where the blade tip is not constrained in the hoop or circumferential direction by the ring (such as in a multiple ring configuration). Preferably, rings made in accordance with the present invention comprise at least 18 plies or material layers, wherein 8 plies of unitape material oriented in the hoop direction are disposed on each exposed side of two adjacent fabric material layers or plies.

With respect to the MMC materials, adequate hoop strength can be provided in most situations where the fiber volume is at least about 30% and, more preferably, at least about 35%. Most preferably, the fiber volume is at least about 40% for applications where the ring is required to operate at a rotational speed of about 1400 ft/sec. at a temperature of about 600° F. with about 10,000 cycles of low cycle fatigue life.

In accordance with another aspect of the present invention, the formation of the rings and the rotatable assemblies of the present invention will now be described. The rings of the present invention can be formed by placing layers 93 of an OMC or MMC material about a mandrel 94 as the mandrel is rotated to form a tube 95 from the material layers 93, as shown in FIG. 11. The mandrel 94 can be formed from steel and its outer surface 96 can be provided with a slight taper so that the tube 95 formed on the mandrel 94 will have an inner surface 98 which is tapered for engaging blades having a tapered blade tip, the benefits of which were previously discussed. The mandrel and composite material layers are then heated to cure the latter, and in the process the mandrel also expands to size the inner surface 98 of the tube 95 by compressing the material layers 93 to form the integral composite tube 95. After cooling the mandrel and tube 95, the mandrel 94 can be removed and the tube 95 cut to form one or more of the composite rings for use in the rotatable assemblies of the present invention.

The rotatable assemblies of the present can be manufactured by heating the ring (e.g., 30, 130, 230, 330, 430, 530, etc.) to a first predetermined temperature greater than a second predetermined temperature of the fan blades and rotatable disk. After heating, the ring(s) can be juxtaposed adjacent the blade tips and cooled so that the ring(s) will shrink and impart a predetermined amount of interfering contact ΔR upon the fan blades. Alternatively, the rotatable assemblies of the present invention can be formed by cooling the fan blades and the rotatable disk to a first predetermined temperature which is less than a second predetermined temperature of the ring(s). After cooling, the ring(s) can be juxtaposed adjacent the blade tips and the fan blades and the rotatable disk can be heated to the second predetermined temperature of the ring(s) such that a predetermined interfering contact ΔR is imparted between the ring(s) and the fan blades.

Having shown and described the preferred embodiments of the present invention, further adaptions of the rotatable assemblies described herein can be accomplished by appropriate modification by one of ordinary skill in the art without departing from the scope of the present invention. Several of such potential modifications have been mentioned, and others will be apparent to those skilled in the art. Accordingly, the scope of the present invention should be considered in terms of the following claims and is understood not be limited to the details of structure and operation shown and described in the specification and drawings.

What is claimed is:

1. A rotatable assembly for use in a gas turbine engine, comprising
   a rotatable disk;
   a plurality of blades for affecting a flow of air passing thereover during use, each blade having a blade root and a blade tip disposed opposite said blade root, said blade roots being attached to said rotatable disk, and each blade tip having a leading edge and a trailing edge; and
   a self-supporting shroud ring extending from the leading edge to the trailing edge of each blade tip and in interfering contact with each blade tip when said rotatable disk is stationary, the shroud ring being formed of an organic matrix composite material containing a boron, graphite or carbide fiber component and being unconstrained by welding or mechanical connector in the axial and tangential directions, and the interfering contact being between about 0.01 and about 0.1 inches.

2. The rotatable assembly of claim 1, wherein the shroud ring has a thickness to diameter ratio of from about 0.0006 to about 0.1.

3. The rotatable assembly of claim 1, wherein the shroud ring is adapted to increase the natural frequency of said blades.

4. The rotatable assembly of claim 1, wherein said interfering contact is maintained throughout operation of the rotatable assembly.

5. The rotatable assembly of claim 1, wherein the shroud ring substantially restricts movement of each of said blades tips in the tangential and axial directions during operation.

6. The rotatable assembly of claim 1, wherein at least one of said plurality of blades comprises both a first piece comprising a first material and a second piece comprising a second material, said second material having a density which is less than the density of said first material.

7. The rotatable assembly of claim 6, wherein up to about 15 percent of the radial height of said blade is formed by said first piece.

8. A gas turbine engine, comprising:
   a fan assembly having a rotatable disk and a plurality of blades for affecting a flow of air passing thereover during use, each blade having a blade root and a blade tip disposed opposite said blade root, each blade being attached to said rotatable disk adjacent said blade root, and each blade tip having a leading edge and a trailing edge;
   a self-supporting shroud ring extending from the leading edge to the trailing edge of each blade tip and in interfering contact with each blade tip when said rotatable disk is stationary, the shroud ring being formed of an organic matrix composite material containing a boron, graphite or carbide fiber component and being unconstrained by welding or mechanical connector in the axial tangential directions, and the interfering contact being between about 0.01 and about 0.1 inches;
   a core engine disposed downstream of said fan assembly, the core engine including a compressor, a first turbine assembly downstream of said compressor, a first shaft connecting said first turbine assembly to said compressor whereby said compressor is driven by said first turbine assembly, and a combuster disposed between said compressor and said first turbine assembly; and a second turbine assembly downstream of said core engine and rotatably connected to said fan assembly by a second shaft, said fan assembly being rotatably driven by said second turbine assembly.

9. The rotatable assembly of claim 1, further comprising a seal disposed adjacent the shroud ring, said seal adapted to resist the flow of leakage air over the shroud ring.

10. The rotatable assembly of claim 9, wherein said seal is formed integrally with the shroud ring.

11. The rotatable assembly of claim 1, wherein the shroud ring is formed of an organic matrix composite material and a graphite fiber component.

12. The rotatable assembly of claim 11, wherein the shroud ring is formed of an epoxy, polyester or polyimide matrix composite material.

13. The rotatable assembly of claim 11, wherein the shroud ring is formed of a bismaleimide matrix composite material and a graphite fiber component.

14. The gas turbine engine of claim 8, wherein the shroud ring is formed of an organic matrix composite material and a graphite fiber component.

15. The gas turbine engine of claim 14, wherein the shroud ring is formed of an epoxy, polyester or polyimide matrix composite material.

16. The gas turbine engine of claim 14, wherein the shroud ring is formed of a bismaleimide matrix composite material and a graphite fiber component.

17. The rotatable assembly of claim 1, wherein the shroud ring is formed of a material exhibiting sufficiently low density and thermal growth to maintain the interfering contact between the ring and each blade tip when the rotatable assembly is operated at speeds up to about 2000 ft/sec and at temperatures up to about 350° F.

18. The gas turbine engine of claim 8, wherein the shroud ring is formed of a material exhibiting sufficiently low density and thermal growth to maintain the interfering contact between the shroud ring and each blade tip when the fan assembly is operated at speeds up to about 2000 ft/sec and at temperatures up to about 350° F.

* * * * *

UNITED STATES PATENT AND TRADEMARK OFFICE
CERTIFICATE OF CORRECTION

PATENT NO. : 6,223,524 B1
DATED : May 1, 2001
INVENTOR(S) : James Francis Durcan It is certified that error appears in the above-identified patent and that said Letters Patent is hereby corrected as shown below:

<u>Column 12, claim 8,</u>
Line 64, change "axial tangential" to -- axial and tangential --.

Signed and Sealed this

Eighteenth Day of December, 2001

Attest:

Attesting Officer

JAMES E. ROGAN
*Director of the United States Patent and Trademark Office*